United States Patent

Braeger et al.

Patent Number: 5,413,525
Date of Patent: May 9, 1995

[54] FISH PROCESSING ARRANGEMENT

[75] Inventors: Horst H. Braeger, Lübeck; Klaus-Dietrich Nüske, Stockelsdorf; Siegbert Wruck, Stralsund, all of Germany

[73] Assignee: Nordischer Maschinenbau Rud. Baader GmbH & Co. KG, Lubeck, Germany

[21] Appl. No.: 254,709

[22] Filed: Jun. 6, 1994

[30] Foreign Application Priority Data

Jun. 7, 1993 [DE] Germany .................. 43 18 810.9

[51] Int. Cl.⁶ .......................................... A22C 25/16
[52] U.S. Cl. .................................. 452/165; 452/161; 452/170
[58] Field of Search ............... 452/161, 165, 170, 163

[56] References Cited

U.S. PATENT DOCUMENTS

| 4,037,294 | 7/1977 | Cowie et al. ............ 452/161 |
| 4,688,297 | 8/1987 | Barters ..................... 450/165 |

FOREIGN PATENT DOCUMENTS 1239827 11/1967 Germany .

*Primary Examiner*—Willis Little
*Attorney, Agent, or Firm*—Fay, Sharpe, Beall, Fagan, Minnich & McKee

[57] ABSTRACT

An auxiliary feeding apparatus (3) for a fish processing machine is described which comprises a conveyor equipped with saddle-like supporting members (1) for supporting the trunks of decapitated fish whose abdominal cavities are open on the ventral side. The auxiliary feeding apparatus (3) comprises an auxiliary saddle (9) for initially supporting each fish to be processed. The auxiliary saddle (9) can be controlled to move into and out of the path of the supporting members (1). The fish to be processed is placed on the auxiliary saddle (9) with its tail leading and, on lowering the auxiliary saddle, is transferred to the supporting member (1). The lowering movement is controlled in such a way, that each fish is taken over by the supporting member without the projecting end (8) of the supporting member coming into contact with the end of the abdominal cavity.

17 Claims, 1 Drawing Sheet

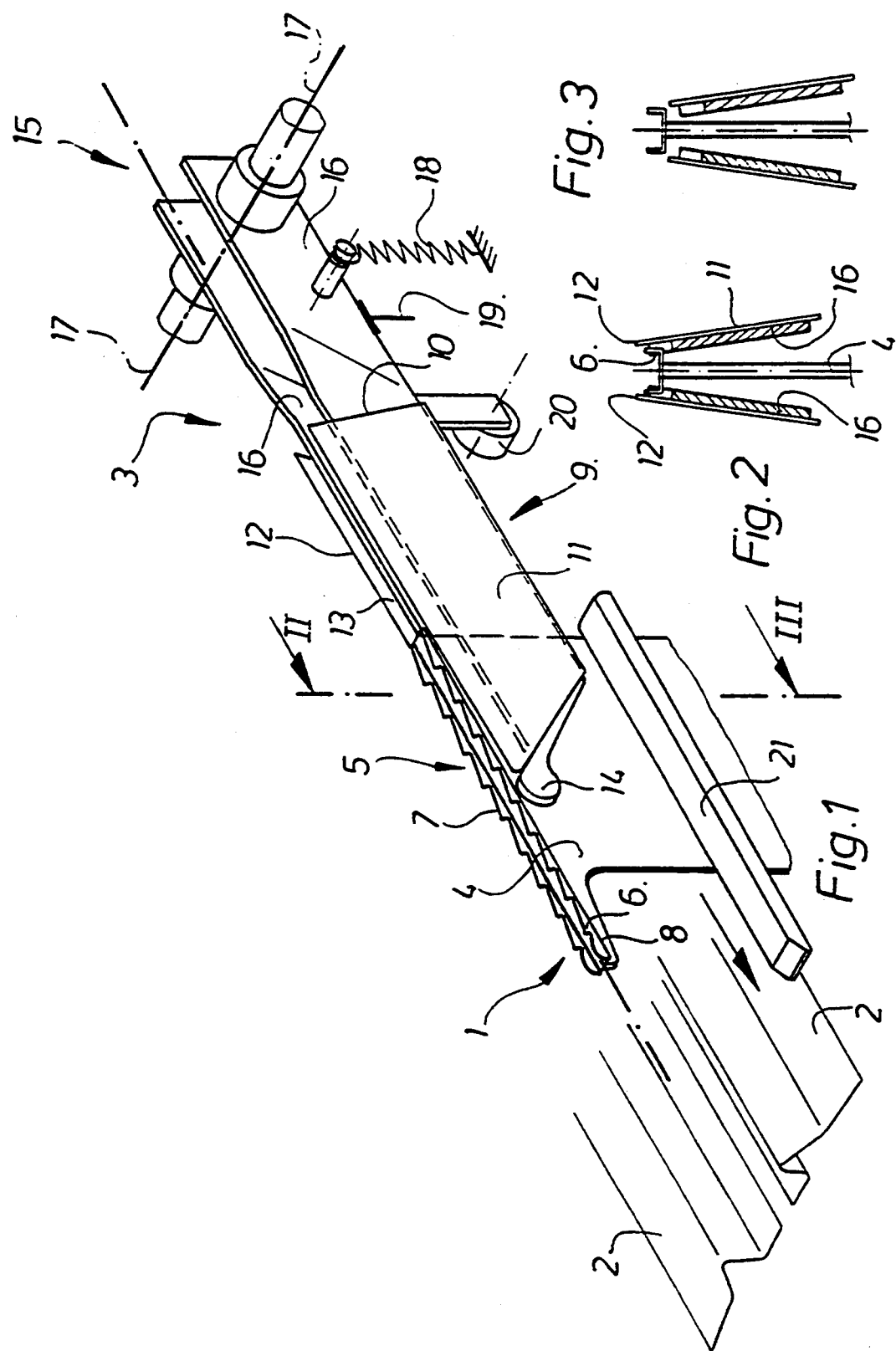

FISH PROCESSING ARRANGEMENT

BACKGROUND OF THE INVENTION

1. Field of the Invention

The invention concerns a fish processing machine for processing decapitated fish trunks having an abdominal cavity open on the ventral side, said machine comprising a conveyor with at least one saddle-like supporting member having a supporting surface for supporting the fish trunks in the abdominal cavity and for conveying the same with the tail end leading, and an auxiliary saddle for initially supporting the fish trunks.

2. Prior Art

An arrangement of this type is known from DE-PS 12 39 827. This document discloses a filleting arrangement for decapitated fish trunks, in which a conveyor with supporting saddle-members is used for the fish to be processed. The supporting members are each provided with a rounded horn or projection pointing in the direction of movement, and with a supporting surface. The fish trunks to be processed have an opening in their abdominal cavities on the ventral side. Each fish is positioned with its abdominal cavity placed on the supporting member in such a way that the tail is leading in the direction of movement, the fish is supported on the inner side of the ribs or on the lateral vertebral appendages and the end of the abdominal cavity rests against the horn of the supporting member.

According to one specific embodiment disclosed in this prior art document, this should occur automatically on transferring of the fish from a stationary horn arranged in the feeding area directly above the path described by the supporting member's surface on which the fish trunk has previously been placed in the manner described above. In this way, the end of the abdominal cavity projects into the path of the supporting member's supporting surface, so that the transfer of a fish trunk placed on the stationary horn is effected by means of the supporting member when the latter's horn rests against the abominal cavity end of the fish.

The quality of fillets obtained on using this arrangement is impaired, in that the fillet meat in the region of the abdominal cavity end is contaminated with blood which seeps into the flesh and is thus virtually impossible to remove. This is caused by the horn being pressed with such force against the abdominal cavity end as a result of the processing and guidance resistances, that blood from the portion of the blood stream located behind the vertebrae on the side of the abdominal cavity is pressed into the meat. This is not acceptable for reasons of appearance and hygiene.

OBJECTS OF THE INVENTION

It is thus an object of the invention to achieve an arrangement with which the quality of fillet meat can be improved.

It is a further object of the invention to achieve an arrangement with which the transfer of fish is effected in a rapid manner while ensuring correct positioning.

It is a further and equally important object of the invention to improve the known arrangement and to alleviate the disadvantages associated therewith.

SUMMARY OF THE INVENTION

This and further objects of the invention are achieved in a fish processing machine for processing decapitated fish trunks with their abdominal cavities open at the ventral side, said machine comprising conveying means defining a longitudinal direction and including at least one saddle-like supporting member defining a supporting surface for supporting said fish trunks in their abdominal cavities and for conveying the same with their tail ends leading in said longitudinal direction; and an auxiliary saddle for initially supporting said fish trunks, wherein the auxiliary saddle comprises a pair of auxiliary supporting elements provided with adjacent supporting edges extending in said longitudinal direction, a gap being formed between said pair of auxiliary supporting elements for allowing the passage of said at least one supporting member, and is controllable to move between a position in which the supporting edges protrude beyond the path of the supporting surface of said at least one supporting member and a position in which said supporting surface protrudes beyond the supporting edges of the auxiliary saddle.

With the arrangement according to the invention, the fish can be placed on the conveyor's saddle-like supporting members in such a way, that the fish is transferred accurately positioned and is securely held in this position by the co-action between the supporting surface of the supporting member and the supporting elements of the auxiliary saddle. The fish trunks are not pulled from the auxiliary saddle onto the supporting members, but are transferred by the exchange of the surfaces supporting the fish. In this way, the massaging of blood into the meat in the vicinity of the abdominal cavity is avoided, even if the supporting element is provided with a projection. This is particularly true if the supporting element is provided with a serrated or toothed surface which safeguard the positive engagement with the fish trunk.

In addition, this embodiment is of ergonomic advantage, since on the one hand, the operator is, to a certain degree, independent of the relative position of the supporting member when introducing the fish and the fish trunks can be accurately positioned more swiftly and easily, and on the other hand, the danger of injury by the moving supporting surface is reduced, which is particularly important if this is formed with serrations or the like. Overall, operator safety is greatly improved by this arrangement.

According to a specific embodiment of the arrangement, the auxiliary saddle can be formed at the free end of a holding arm arranged as a towing lever. The advantage of this configuration lies in the transfer of the fish to the supporting member being effected by the preferably toothed supporting surface engaging the fish first in the region of the abdominal cavity and then progressively up to the head end, ensuring that the fish is transferred virtually without slippage and thus accurately maintained in the transfer position.

BRIEF DESCRIPTION OF THE DRAWINGS

Other and further objects of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a perspective view of the auxiliary apparatus according to the invention shortly after the transfer of a fish;

FIG. 2 shows a cross-sectional view according to the line II-III of the apparatus of in FIG. 1 while in raised position; and FIG. 3 shows a cross-sectional view according to the line II-III of the apparatus of in FIG. 1 while in lowered position.

DETAILED DESCRIPTION OF THE PREFERRED EMBODIMENTS

An endless conveyor (not shown) having supporting members 1 for supporting the fish to be processed is arranged and driven to move continuously in an appropriate manner in a frame, which is also not shown, e.g. for a fish filleting machine (FIG. 1). The path described by the supporting members 1 runs between guide elements 2, which are only hinted at in FIG. 2, and an auxiliary feeding apparatus 3, which serves as an intermediate support and pre-positioning means for the fish to be processed, and then continues into the working area of filleting machines (not shown).

The supporting members 1 are mounted on the conveyor at a pitch which corresponds at least to the length of the largest specified fish to be processed. Each supporting member 1 comprises a saddle web 4 having a supporting surface 5 which extends along the conveyor and essentially parallel to the same. This is formed with a U-shaped profile due to the upper edges of two projecting webs 6, which are formed as rows of serrations or teeth 7 whose steep shoulders face the conveying direction. The front end of the supporting member 1 is formed with a horn or beak-shaped, preferably rounded projection 8.

The auxiliary feeding apparatus 3 defines an auxiliary saddle 9 and comprises a pair of supporting elements 10 arranged symmetrically on either side of the of the supporting members' 1 path. The supporting elements 10 comprise supporting faces 11 extending lengthways and inclining roofshaped towards one another, and having supporting edges 12 with a gap 13 between them for allowing the passage of the supporting surfaces 5. The leading ends of the auxiliary saddle's 9 supporting elements 10 are also formed as projecting stop members 14, and in this region the gap 13 is reduced to a width which allows only the passage of the saddle web 4 of the supporting member 1.

The auxiliary saddle 9 is attached to the free end of a holding arm 15, which comprises a pair of bearing levers 16 arranged on each side of the supporting elements' 10 path. The bearing levers 16 are mounted to pivot at their rear ends on coaxial axes 17 running transverse to the path of the supporting members 1, and are held against a stop member 19 by means of tension springs 18. A downwardly directed cam roller 20 which is mounted on each bearing lever 16 projects into the path of cam rails 21 attached to the side of the saddle web 4.

The loading of the auxiliary feeding apparatus according to FIG. 1 takes place after a supporting member 1 has passed out of the vicinity of the auxiliary saddle 9. In this phase, the auxiliary saddle 9 assumes a lowered position determined by the stop member 19 due to the effect of the tension spring 18 (FIG. 3). The decapitated fish trunk is then placed with its abdominal cavity on the auxiliary saddle 9 and its tail pointing in the direction of movement of the conveyor. On doing this, the abdominal flaps containing the ribs are spread by the supporting elements 10 of the auxiliary saddle 9 and the trunk is supported on the supporting edges 12 which lie on either side of the vertebrae and rest against the vertebral appendages or ribs. The saddled fish trunk is then pushed in a direction against the conveying direction until the projecting stop member 14 of the auxiliary saddle 9 abuts the end of the abdominal cavity. The loading is thereby terminated.

On the arrival of the next supporting member 1 in the area of the auxiliary feeding apparatus 3, the cam rollers 20 on the bearing arms run over the cam rails 21 and cause the auxiliary saddle 9 with the fish to be raised into a position in which the supporting edges 12 of the auxiliary saddle 9 just protrude above the level of the supporting surface 5. As a result of this, the supporting member 1 is guided hidden in the gap 13 between the supporting members 10 (FIG. 2).

This position is maintained until the projection 8 of the supporting member 1 is in the immediate vicinity of the projecting stop member 14 of the auxiliary saddle 9. At this moment the cam rollers 20 reach the end of the cam rails 21 and the auxiliary saddle 9 is pulled down into its lowered position by the force of the tension springs 18. As a result, the supporting surface 5 protrudes above the supporting edges 12 of the auxiliary saddle 9 so that the fish is taken over by the supporting member 1. On effecting the transfer, the fish is engaged by the serrations or teeth 7 locking between its lateral vertebral appendages or ribs, ensuring thereby the secure takeover of the fish.

The lowering movement of the auxiliary saddle 9 is controlled by the form of the cam rails 21 in such a way, that the projection 8 of the supporting member 1 lies in the abdominal cavity at a predetermined distance from the end of the latter. Suitable guide means act on the exterior of the fish to ensure that the fish is held pressed down on the supporting surface 11 so that the fish safely maintains its feeding position even when subjected to forces during processing.

LIST OF REFERENCE NUMERALS

1 Supporting member
2 Guide elements
3 Auxiliary feeding apparatus
4 Saddle web
5 Supporting surface
6 Web
7 Serrated tooth
8 projection
9 Auxiliary saddle
10 Supporting elements
11 Supporting surface
12 Supporting edge
13 Gap
14 Stop member
15 Holding arm
16 Bearing lever
17 Axis
18 Tension spring
19 Stop member
20 Cam roller
21 Cam rail

We claim:

1. A fish processing machine for processing decapitated fish trunks, said fish trunks comprising a tail portion and a ventral side and having an abdominal cavity with an abdominal cavity end, said abdominal cavity being open on said ventral side, said machine comprising conveying means defining a longitudinal direction of movement and including at least one saddle-like supporting member defining a supporting surface for supporting said fish trunks in their abdominal cavities and for conveying the same with the tail portion leading in said longitudinal direction, said supporting surface describing a path of movement, and auxiliary saddle means for initially supporting said fish trunks, wherein said auxiliary saddle means comprises supporting elements provided with adjacent supporting edges extending in said longitudinal direction, a gap being formed between said supporting elements for allowing the passage of said at least one supporting member, said auxiliary saddle means being controllable to move between a first position in which said supporting edges protrude beyond said path of said supporting surface of said at least one supporting member and a second position in which said supporting surface protrudes beyond said supporting edges of said auxiliary saddle means.

2. A fish processing machine as claimed in claim 1, wherein said auxiliary saddle means is arranged to be controllable dependently on the relative position between itself and said supporting member.

3. A fish processing machine as claimed in claim 1, wherein each said supporting element comprises a leading end, said supporting element being provided with stop means on said leading end which is adapted to the anatomical characteristics of said fish abdominal cavity end.

4. A fish processing machine as claimed in claim 1, wherein there is provided a holding arm having a free end and arranged as a towing lever, said auxiliary saddle means being connected to said free end of said holding arm.

5. A fish processing machine as claimed in claim 1, wherein each of said supporting member and said auxiliary saddle means are provided with respective control means which are arranged for operative cooperation with one another.

6. A fish processing machine as claimed in claim 2, wherein each said supporting element comprises a leading end, said supporting element being provided with stop means on said leading end which is adapted to the anatomical characteristics of said fish abdominal cavity end.

7. A fish processing machine as claimed in claim 2, wherein there is provided a holding arm having a free end and arranged as a towing lever, said auxiliary saddle means being connected to said free end of said holding arm.

8. A fish processing machine as claimed in claim 2, wherein each of said supporting member and said auxiliary saddle means are provided with respective control means which are arranged for operative cooperation with one another.

9. A fish processing machine as claimed in claim 3, wherein there is provided a holding arm having a free end and arranged as a towing lever, said auxiliary saddle means being connected to said free end of said holding arm.

10. A fish processing machine as claimed in claim 3, wherein each of said supporting member and said auxiliary saddle means are provided with respective control means which are arranged for operative cooperation with one another.

11. A fish processing machine as claimed in claim 4, wherein each of said supporting member and said auxiliary saddle means are provided with respective control means which are arranged for operative cooperation with one another.

12. A fish processing machine as claimed in claim 6, wherein there is provided a holding arm having a free end and arranged as a towing lever, said auxiliary saddle means being connected to said free end of said holding arm.

13. A fish processing machine as claimed in claim 6, wherein each of said supporting member and said auxiliary saddle means are provided with respective control means which are arranged for operative cooperation with one another.

14. A fish processing machine as claimed in claim 7, wherein each of said supporting member and said auxiliary saddle means are provided with respective control means which are arranged for operative cooperation with one another.

15. A fish processing machine as claimed in claim 9, wherein each of said supporting member and said auxiliary saddle means are provided with respective control means which are arranged for operative cooperation with one another.

16. A fish processing machine as claimed in claim 12, wherein each of said supporting member and said auxiliary saddle means are provided with respective control means which are arranged for operative cooperation with one another.

17. A fish processing machine as claimed in claim 1, wherein said supporting surface comprises serrations directed in the direction of movement of said conveying means for securely engaging said fish trunks.

* * * * *